Nov. 11, 1958   E. L. HARLOW ET AL   2,859,871
APPARATUS FOR TESTING AND ASSORTING ARTICLES
Filed July 28, 1955   8 Sheets-Sheet 1

INVENTORS:
ERNEST L. HARLOW
HARRY E. FRECH, JR.
BY  JOHN C. BLAINE

John D. Wilkins
ATTORNEY

FIG. 2

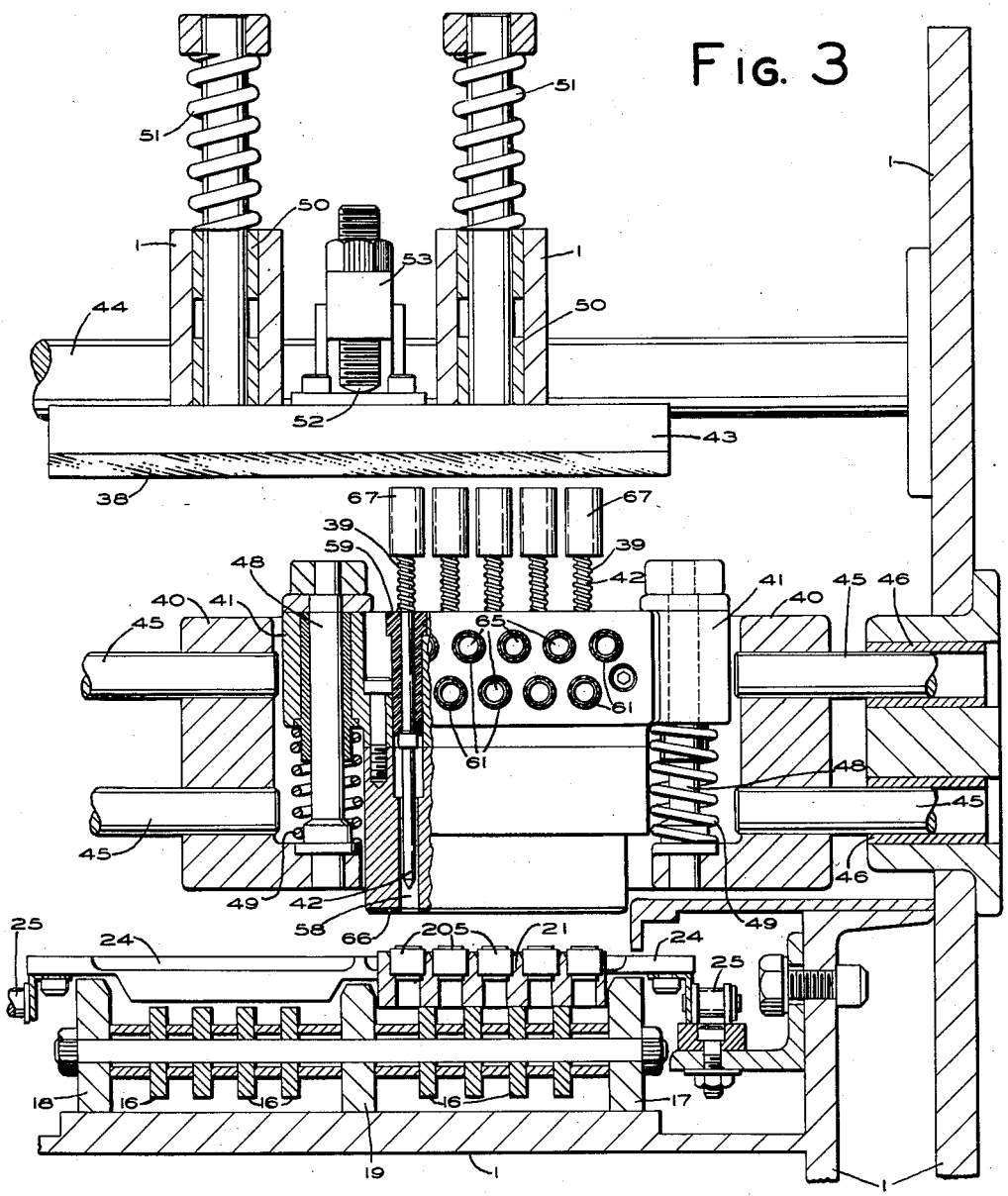

Nov. 11, 1958     E. L. HARLOW ET AL     2,859,871
APPARATUS FOR TESTING AND ASSORTING ARTICLES
Filed July 28, 1955     8 Sheets—Sheet 4
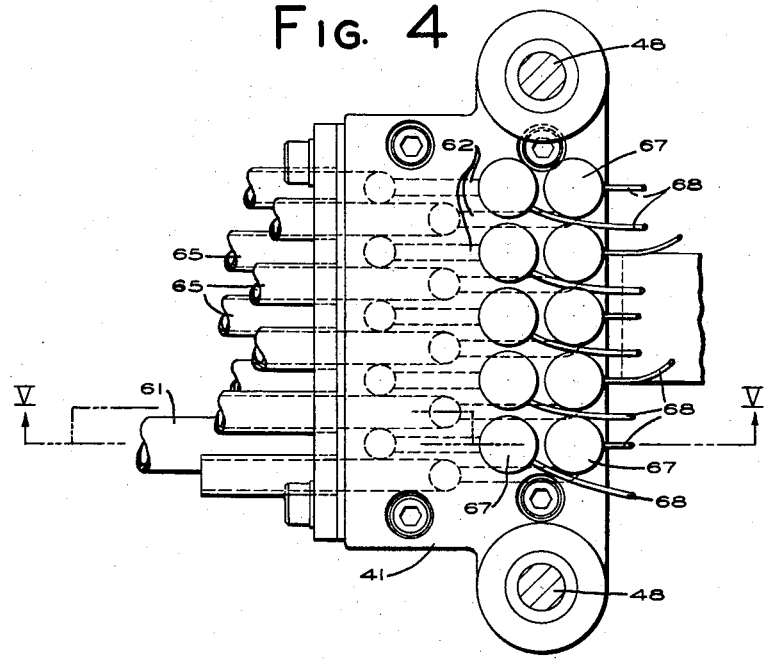
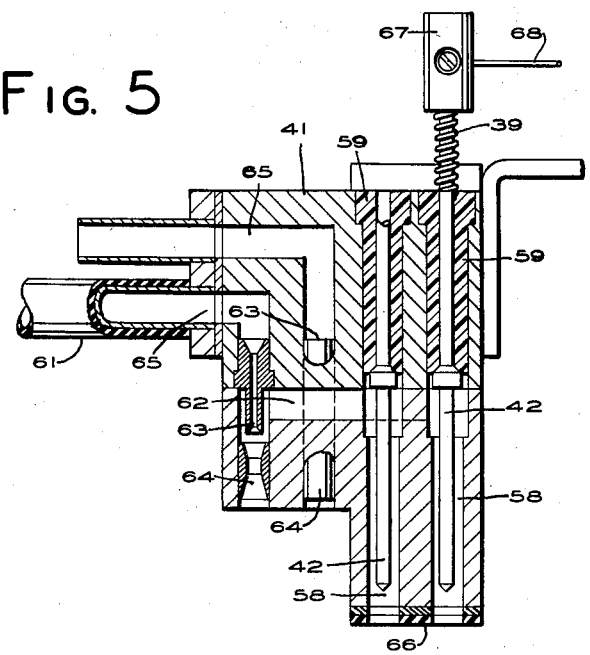
INVENTORS:
ERNEST L. HARLOW
HARRY E. FRECH, JR.
BY JOHN C. BLAINE
ATTORNEY Nov. 11, 1958 E. L. HARLOW ET AL 2,859,871
APPARATUS FOR TESTING AND ASSORTING ARTICLES
Filed July 28, 1955 8 Sheets-Sheet 5

INVENTORS:
ERNEST L. HARLOW
HARRY E. FRECH, JR.
BY JOHN C. BLAINE

John D. Wilkins
ATTORNEY

INVENTOR.
ERNEST L. HARLOW
HARRY E. FRECH, JR.
JOHN C. BLAINE
BY
John D. Wilkins
ATTORNEY

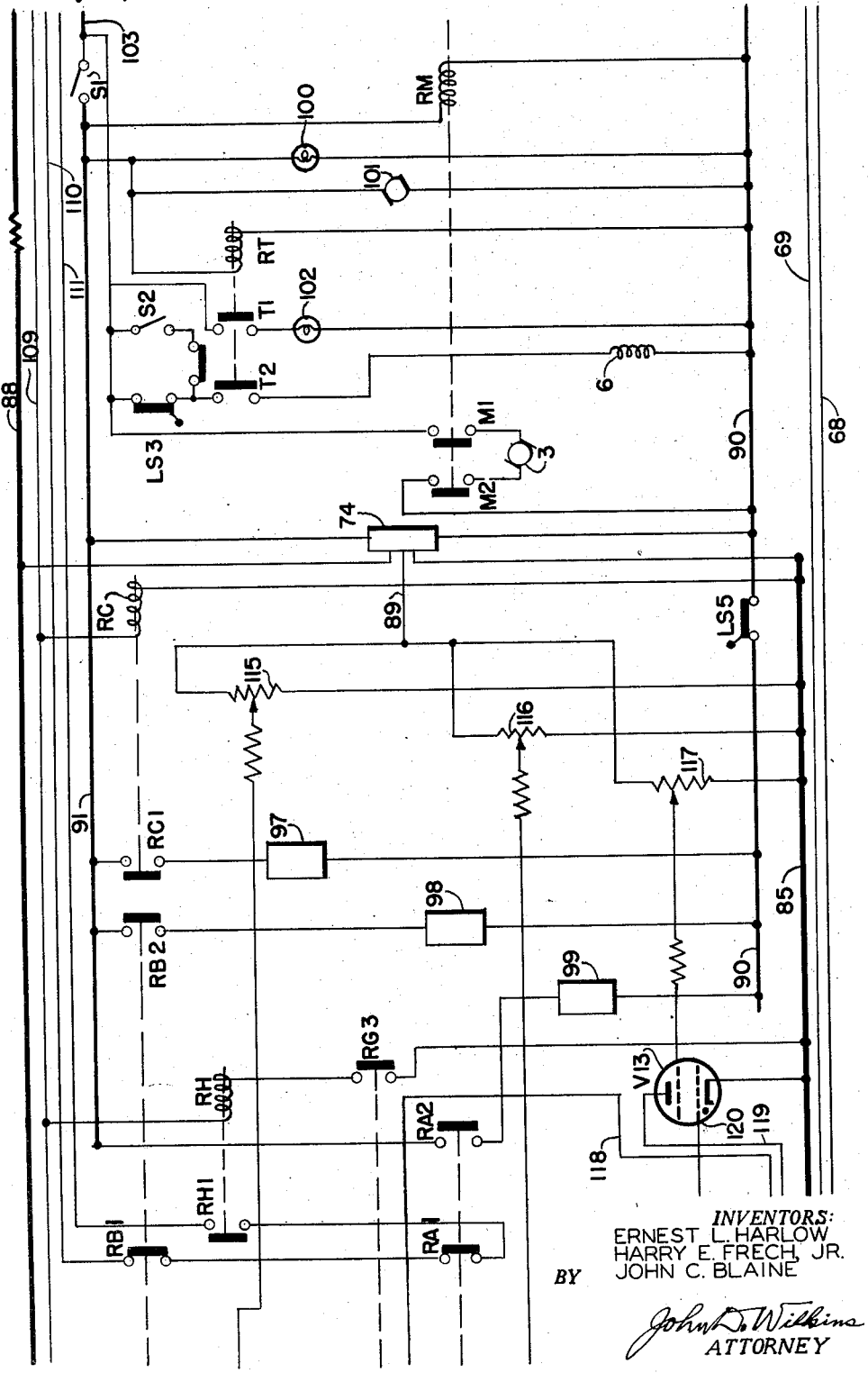

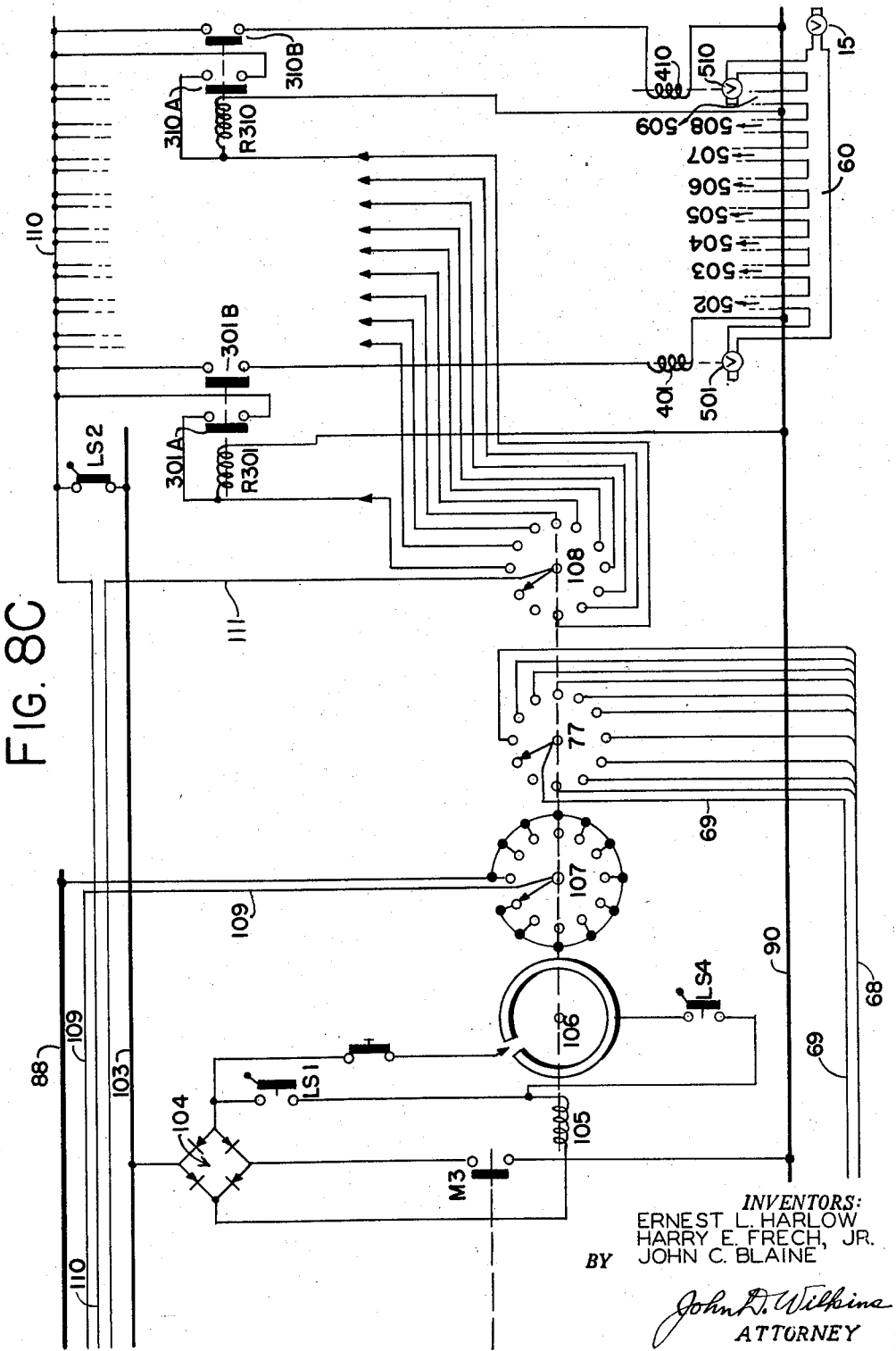

United States Patent Office 2,859,871
Patented Nov. 11, 1958

2,859,871

APPARATUS FOR TESTING AND ASSORTING ARTICLES

Ernest L. Harlow, Alton, Ill., Harry E. Frech, Jr., University City, Mo., and John C. Blaine, Roxana, Ill., assignors to Olin Mathieson Chemical Corporation, East Alton, Ill., a corporation of Virginia Application July 28, 1955, Serial No. 524,929

12 Claims. (Cl. 209—81)

This invention relates to a machine for testing the properties such as electrical resistance or conductivity of articles being manufactured and is especially useful in separating acceptable electric primers, such as are used in ammunition, from defective electric primers.

Primers of the kind to which this invention is applicable are fitted to the closed end of a shell case of electrically fired ammunition. The primers contain material which will explode the charge when a proper current is passed through the actuating components of the primer. In order to operate properly without failure for the purpose for which it is designed, an electrical primer must have a resistance coming within a certain predetermined value. The primer unit is designed to operate acceptably within a desired range of resistance. The upper limit of the range is such as to exclude primers which have too high a resistance or are open-circuited. The lower limit is such so as to exclude primers having too low a resistance such as those which are short-circuited.

One heretofore known method of making a selection of acceptable primers from a large number manufactured involves testing each individually by means of a suitable ohmeter or bridge circuit first for either the low or high limit and afterwards for the other limit. This expensive procedure is tedious and consumes not only a considerable amount of time but also requires that careful track be kept of each primer to avoid confusion between those partially and those completely tested. Another method of testing better suited to production operation attempts to cover the entire range in one step for each article and this will be recognized to result in loss of precision inasmuch as the range covered is too broad for a single electrical bridge or other circuit to cover it with equal precision at both ends of the range. Another disadvantage of other prior testing apparatus and methods is that they are adapted generally for handling a single primer per step of the machine fed from a large group of the primers crowded together in some type of hopper or chute. This makes the test operation not only rather slow and expensive but also quite dangerous.

One of the objects of this invention is to provide a new and improved apparatus capable of detecting accurately departures of electroresponsive articles from predetermined standards and of making the necessary selection of acceptable articles and rejection of the unacceptable ones without failure. Another object is to provide a device for automatically and rapidly subjecting a relatively large number of articles to an electroconductive test substantially simultaneously. Another object is to separate articles such as primers having the correct range of resistance from defective articles rapidly and efficiently so as to facilitate the handling and testing of them in mass production. Another object is to provide resistance testing equipment and procedure operating on the principle of acceptance rather than rejection which will reject all the articles, if the apparatus develops a failure, and thus will give a more reliable test than may be had with heretofore available equipment. Still another object is to provide a new and improved apparatus for testing electroresponsive articles automatically wherein variations resulting from differences in the contact of the apparatus with the articles tested is substantially completely eliminated. Another object is to obviate or minimize the risk of accidental injuries and damage from inadvertent explosion of the primers during testing.

Other objects and advantages will be apparent and the invention will be better understood from the following description of a preferred embodiment taken in conjunction with the accompanying drawing in which:

Figure 2 is a plan view of the machine taken on line III—III of Figure 1;

Figure 3 is a side elevational view partly in cross-section taken on line III—III of Figure 2 enlarged to show certain of the details of construction of the testing and transfer mechanism of the machine;

Figure 4 is an enlarged plan view including the testing and transfer block and probes shown in Figure 3;

Figure 5 is an elevational view in cross-section taken on line V—V of Figure 4;

Figures 8A, 8B and 8C are a circuit diagram of the control and test circuit of the machine.

Figure 1:
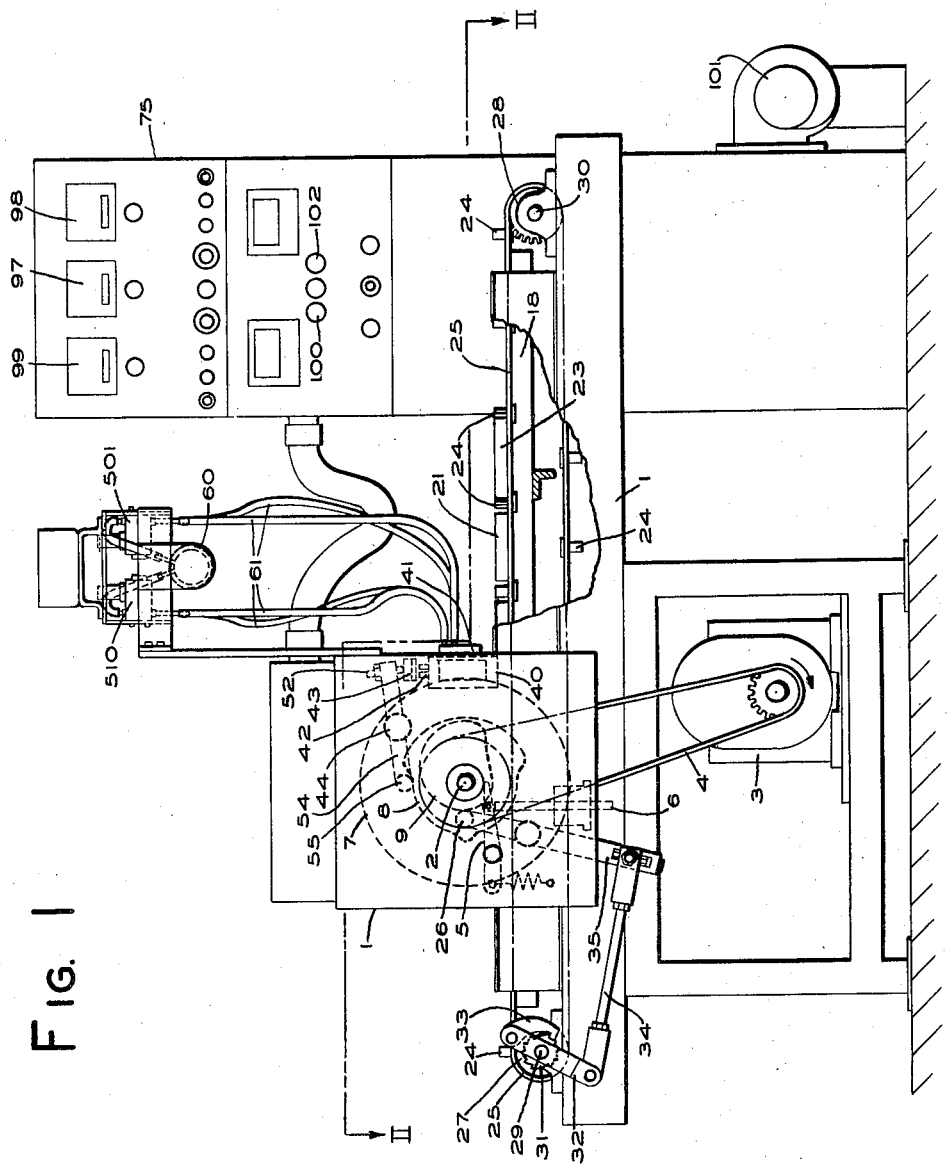
Figure 1 is a front elevational view of the machine according to one preferred embodiment of the invention.

The apparatus in general comprises a frame 1 and mounted upon the frame an article conveyor mechanism for feeding primers to be tested, a motor driven main drive shaft 2, an indexing mechanism for operating the conveyor with the desired motion, a test head assembly, test head actuating means and indexing mechanism actuating means driven by the main shaft, an electronic test and electric control circuit, and electric control actuating means governed by said main shaft. All the elements of the apparatus of this invention are associated together and cooperate to accomplish automatic testing of electric primers which are conveyed to the test station. The apparatus is so designed that groups of electrically operated primers suitable for use in ammunition, for example, are automatically fed to a test station by accurate indexing movement at which position a testing mechanism accomplishes an electric contact with the desired relatively large number of primers for rapid testing of the group of primers at the test station. A new and improved type of test mechanism not only accomplishes the desired electric contact but also applies suction for picking up only those primers which are acceptable after which the test mechanism moves to transfer and deposit the acceptable primers selected into suitable receptacles at the accept station. The apparatus electrically tests a relatively large number of primers at each step in synchronism with the article feed and transfer elements of the device. Desired synchronism and interlock of the mechanical and electrical elements of the apparatus is obtained by way of a main shaft assembly comprising a series of cams which give the desired mechanical and electrical operation.

The apparatus is electrically powered. Movement is derived from the main drive shaft 2 which is driven by the electric motor and variable speed drive device 3 from which the power is channeled in any suitable way such as by means of chain drive 4 to one end of the main drive shaft to connect therewith disengageably by means of the one-revolution clutch 5 which is directly operated by the solenoid 6. Clutch 5 is ordinarily engaged when power is applied but may be disengaged for the purpose of operating the apparatus manually during set up and for other examination or adjustment purposes.

Main shaft 2 carries upon it in fixed position various mechanism operating cams and main control cams. The operating cams consist of the test head operating cylindrical cam 7, the test probe operating cam 8 and the indexing ratchet operating cam 9. The control cams include pulsing cam 10, the air valve reset cam 11, the stop position cam 12, the master selector switch synchronizing cam 13 and the main air valve control cam 14. Suitable cam followers are associated with the mechanical operating cams, while certain limit switches follow the electric control cams 10, 11, 12 and 13. The main air valve 15 is follower operated by control cam 14. The operation and control occasioned by this array of cams are described hereinafter at appropriate points as the description proceeds.

Also mounted on the frame 1 is an electroconductive support comprising a series of spaced electroconductive rails 16 which are assembled together with side bars 17 and 18 and the center bar 19. Side bar 17 and center bar 19 define the entry area 20 along which test plates or blocks 21 resting upon rails 16 and loaded with primers are fed to the test station 201 located at one end of the entry area at the other end of which electroconductive test blocks 21 loaded with primers to be tested are inserted at a loading station 200. Side bar 18 and center bar 19 define a guideway 22 along which suitable receptacles 23 for the tested primers are carried to the accept station 202 which is located at one end of the receptacle guideway adjacent to and just across from the test station in the entry area. The test blocks and receptacles each have primer receiving open ended recesses in a suitable column and row arrangement. As an added feature of safety it is to be noted, Figure 3, that the open ended recesses of the test plates 21 and of the rceptacles 23 are aligned with the spacing between the rails 16 and the bars 17 or 18 and the bar 19. In the event that a primer in one of the recesses should inadvertently fire for any reason, this alignment permits the blast to be directed downwardly through the space between the rails without confinement and without causing damage or injury to any appreciable extent.

The test blocks and receptacles resting on the rails 16 are mobilized by means of pusher bars 24 each of which extends transversely across the entry area and receptacle guideway. Adjacent pusher bars are spaced desirably and evenly from each other so that the spaces in the entry area and in the guideway are big enough to cradle test blocks and receptacles with spacing in the direction of conveyance equal to the index advance, or multiples thereof, or to the sum of constituent advances of a cycle. Each pusher bar is supported at the ends which are mounted on the pair of movable, continuous roller chains 25 each of which is suspended between a head sprocket 27 and a tail sprocket 28 fixed on head shaft 29 and tail shaft 30, respectively, journaled in suitable bearings on the frame 1. Shaft 30 is acted on by a sliding brake 118, for example, to give suitable drag. At one end head shaft 29 is provided with a chain indexing ratchet wheel 31 fixed on the shaft and also with a pawl operating lever 32 rotatably mounted intermediate its ends upon head shaft 29. One end of lever 32 carries ratchet pawl 33 while the other end of lever 32 is pivotally connected to one end of a chain indexing connecting rod 34 of adjustable length. The other end of the rod is pivotally mounted with respect to one end of indexing lever 35 which is pivotally mounted intermediate its ends upon frame 1. The other end of the indexing lever 35 carries a roller type cam follower 26 for cooperation with the indexing ratchet operating cam 9 fixedly mounted on the main shaft 2.

The pusher bars 24 mounted on the roller chains 25 are spaced from each other along the roller chains in such a way that each indexing operation presents a new set of articles precisely positioned at the test station. Fine adjustment of the amount of movement and the resultant alignment with the test mechanism obtainable with each indexing operation is obtained by adjustment in the length of the connecting rod 34 and by adjustment in the pivot point at which connecting rod 34 is linked to the indexing lever 35.

Figure 2:
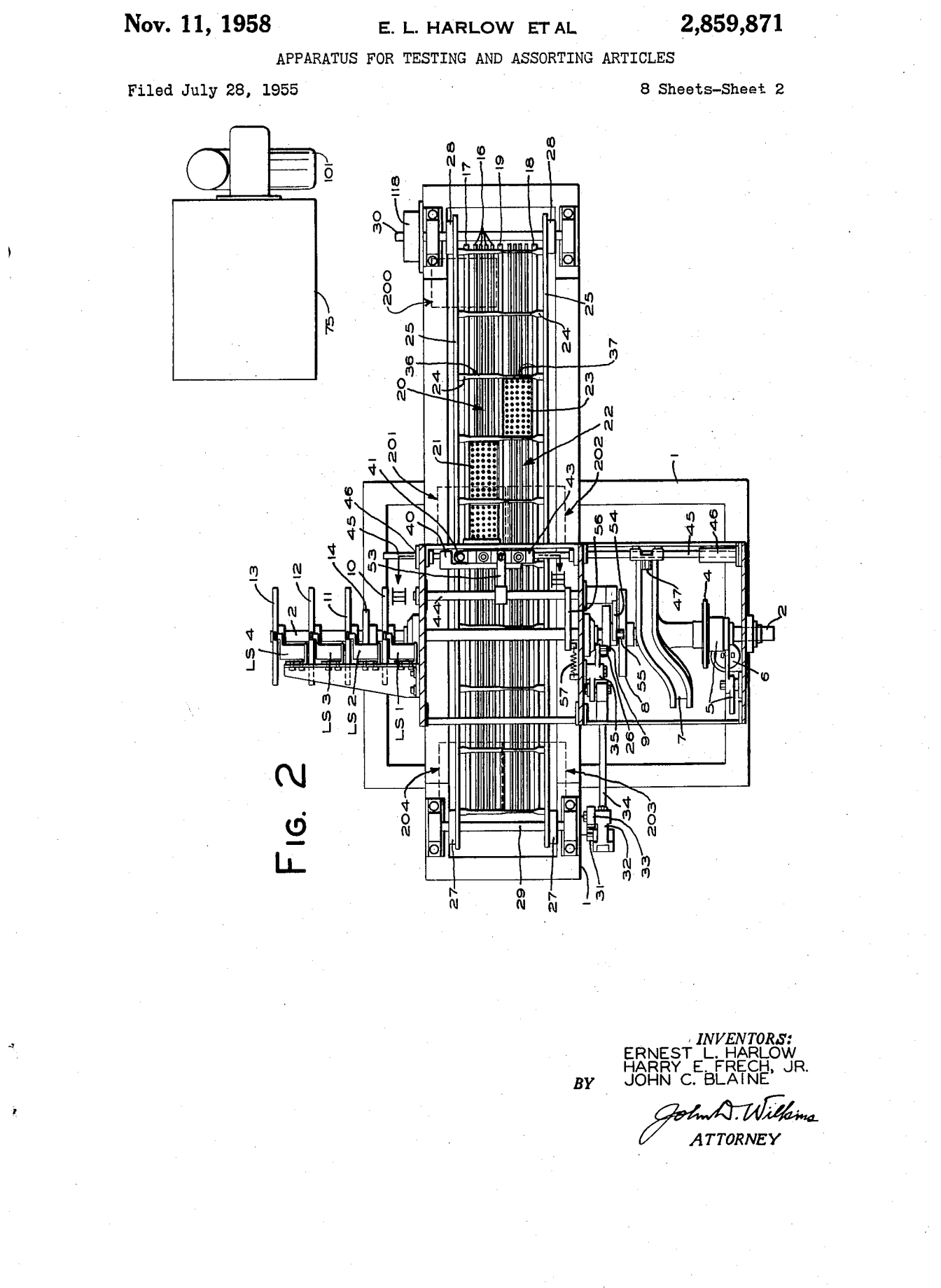

The pusher bars 24, it will be noted from Figure 2, are made of a different thickness in that portion 36 which spans the entry area 20 from the thickness in that portion 37 which spans the receptacle guideway 22. This gives a different spacing between pusher bars over the entry chute as compared to the spacing over the receptacle guideway and prevents interchange of receptacles 23 and test plates 21 which might inadvertently occur, if the receptacles and plates were of the same size.

In order to span the gap between successive test plates 21 and receptacles 23 occupied by the pusher bar 24, indexing ratchet wheel 31 is provided with an occasional tooth at suitable intervals larger than the others to provide the necessary increased indexing advance. In this embodiment, the ratchet 31 has two sets of four equal teeth, each set followed by one wider tooth to give the advance over pusher bars 24. These ratchet teeth may be spaced in any way just so long as they are spaced to index the pusher bars 24 by increments exactly equal to the center-to-center spacing between the adjacent rows of cavities or recesses in the direction of conveyor advance of the indexing mechanism of both the test plates 21 and the receptacles 23.

Also mounted on the frame is a test head mechanism consisting of a test head slide 40 movable transversely with respect to the direction of travel of the indexing mechanism, a vertically reciprocable testing and transfer block 41 carried by the slide 40, a series of electric test probes 42, a pusher plate 43, and a pusher plate or probe actuating shaft 44. The test head slide is provided with slider rods 45 reciprocably mounted in slide bearings 46 carried on the frame 1. The slider rods 45 are fixedly mounted in the slide; and fastened to the slider rods on one side of the slide is a roller follower 47 which follows along the cam track of the test head operating cam 7 fixedly mounted on the main shaft. Operation of cam 7 causes slide 40 and its associated mechanism to reciprocate between a position over the test station 201 and a position over the accept station 202. The test and transfer block 41 is slidably mounted on a pair of vertical posts 48 carried by the slide 40, Figure 3. Also mounted on each of the vertical posts is a block return spring 49. Pusher plate 43 is reciprocably mounted on the frame 1 by means of suitable bushings 50 and is urged in the return direction by means of the return springs 51. An adjustable pusher plate actuating tip 52 is carried on the end of a plate actuating arm 53 which is fixedly mounted with respect to the probe actuated shaft 44 pivotally mounted in the frame 1. This shaft 44 is in turn actuated by an arm 54, fixedly mounted on one end of the shaft at one end of the arm 54 while the other end of the arm carries a roller follower 55 for following the profile of the probe operating disc cam 8 fixedly mounted on the main shaft 2. Also fixedly mounted on probe actuated shaft 44 is a spring return arm 56 to one end of which there is attached a tension spring 57.

Associated with the test and transfer mechanism is a compressed air manifold 60 having a series of flexible airlines 61 leading from the manifold to the test and transfer block 41 for a purpose which will appear hereinafter. Each line 61 is controlled by its own solenoid operated, normally closed air valve. Inasmuch as in this embodiment the test head is designed to test a group of ten primers for each cycle of operation, there are ten test probes 42, a flexible line 61 for each probe and consequently ten solenoid operated air valves 501, 502–510.

The testing and transfer block 41, Figure 5, is provided with a number of bore holes 58 each of which extend from the top face to the bottom face of the block and each of which carries a test probe 42 constrained by a test probe spring 39. The stem of each probe 42 is mounted slidably in its bore in block 41 in an electrically insulating bushing 59. The front end of each probe is adapted to protrude beyond the front face of block 41 and make electrical contact with a primer 205 undergoing testing. Bushings 59 also serve to close off the upper end of each of the bore holes 58 in the block. Connecting with the open front end of each bore hole is a pneumatic aspirating passageway 62 the other end of which is connected to an aspirator connected to one of the flexible air lines 61. Each aspirator consists of a jet nozzle 63 which receives air from air lines 61 through delivery passages 65 and directs an air blast into a venturi tube 64 mounted ahead of the nozzle for receiving air issuing from the nozzle and for exhausting delivered air from the block. The lower perforated surface of the testing and transfer block 41 is preferably provided with a flexible facing or pad of resilient material 66 provided with perforations corresponding with the lower openings of the bore holes 58 in the block. This suction pad or facing 66 carried on the lower surface of the block is adapted to act as a shock absorber, resist wear and seat around the upper edge of each of the primers 205 carried in the test block 21 resting on the rails 16, Figure 3, and to form a sealing connection with the primer as it is subjected to vacuum applied by way of the bore holes 58 in accordance with the air blast admitted to the flexible airlines 61 by the solenoid operated valves 501, et cetera, as they respond in accordance with the test results sensed by the machine. While the facing 66 serves to improve the pneumatic pick-up, when it forms a sealing connection with the primer, in some instances a seal at the pad or facing 66 is not required and particularly when the suction employed is alone adequate to pick up articles of comparatively light weight. It will also be appreciated that the air blast issuing at intervals from the block 41 has a cleaning effect upon the articles as they approach the test station 201.

Each electric probe 42 consists of a stem and an enlarged head 67 mounted on the rear end of the stem electro-conductively. Each head 67 is a test pressure receptor and also receives a test lead 68 in a suitable recess having any suitable means such as a set screw for holding the lead electroconductively. The front end of the stem of each probe 42 is tapered down to form a flat contact surface having a diameter of about 0.010 of an inch. Test probe spring 39 are mounted about the test probe stems between the heads 67 and the insulating bushings 59.

The lower face of pusher plate 43 carries a relatively thick pad or sheet 38 of highly flexible material such as rubber of sufficient softness for applying pressure substantially uniformly to each of the heads 67 of the test probes 42. Adjustment of the contact pressure is made by means of the adjustment of the projection of pressure tip 52 screw threadedly mounted on arm 53.

As it is evident from Figures 4 and 5, test and transfer block 41 has ten bore holes 58 corresponding with each set of ten recesses in test plates 21 and also ten sets of aspirating passageways 62 and fluid pressure inlets 65 connecting with the ten flexible air lines 61 which permit the test block to be moved laterally as well as vertically during the testing operation. It will be understood that while the apparatus is described for testing a group of ten primers, it is adaptable to testing any relatively large number of primers and that the number of probes 42, bore holes 58, air lines 61, et cetera, will correspond to the number of primers in the group undergoing test.

It is to be noted that the test probe arrangement of this machine has been found to be a great advantage in providing a remarkably uniform degree of contact between the test probes 42 and the primers 205 which are ordinarily substantially identical in dimensions as a result of rigid mechanical specifications and previous gauging. All of the test probes are characterized by substantial identity in size and shape, and by a relatively blunt flat contact point conforming to a given standard area of contact. All of the test probe springs 39 are relatively soft springs pre-loaded and substantially uniform in characteristics. The contact pressure pad or sheet 38 carried on the lower face of pusher plate 43 is sufficiently thick and soft so as to apply contact pressure substantially free from variation as a result of the higher order minor variations in dimension encountered in the mechanical components involved. As a result the chief variation which is encountered is that due to wear of the pad 38 and the points of the probes 42 which occurs evenly and at such a low rate as to require adjustment at infrequent intervals.

The test probe mounting has other advantages. It is such as to apply no contact pressure after testing is completed while the test head mechanism moves from the test station to the accept station so as to cause no interference with the pick-up and transfer function of the head. It is such that with suitable stops or proportioning of the springs 39 against the springs 49 it is adapted to enable, when desirable with articles of certain configuration, contact of the probes with the primers once again only at the accept station for the purpose of assuring release of acceptable primers at this station.

The testing and assorting apparatus of this invention also includes an electric testing circuit and control largely housed in the electric controller cabinet 75. Contained in the cabinet are an electronic test circuit and its associated selector and control relays, a suitable direct current electronic power supply 74 characterized by a high degree of voltage regulation both in the "B" or plate supply and the filament supply, which is separate from the "B" supply, a master test lead and electric circuit selector mechanism and a battery of assorting controller contactors and their associated relays. In order to cool the electrical components contained in the cabinet 75 and to keep them clean from any explosive dust which is likely to be encountered in the test environment, the cabinet interior is pressurized to a certain extent by a stream of filtered cooled air injected at one end of the cabinet and exhausted from the other.

Figure 8A:
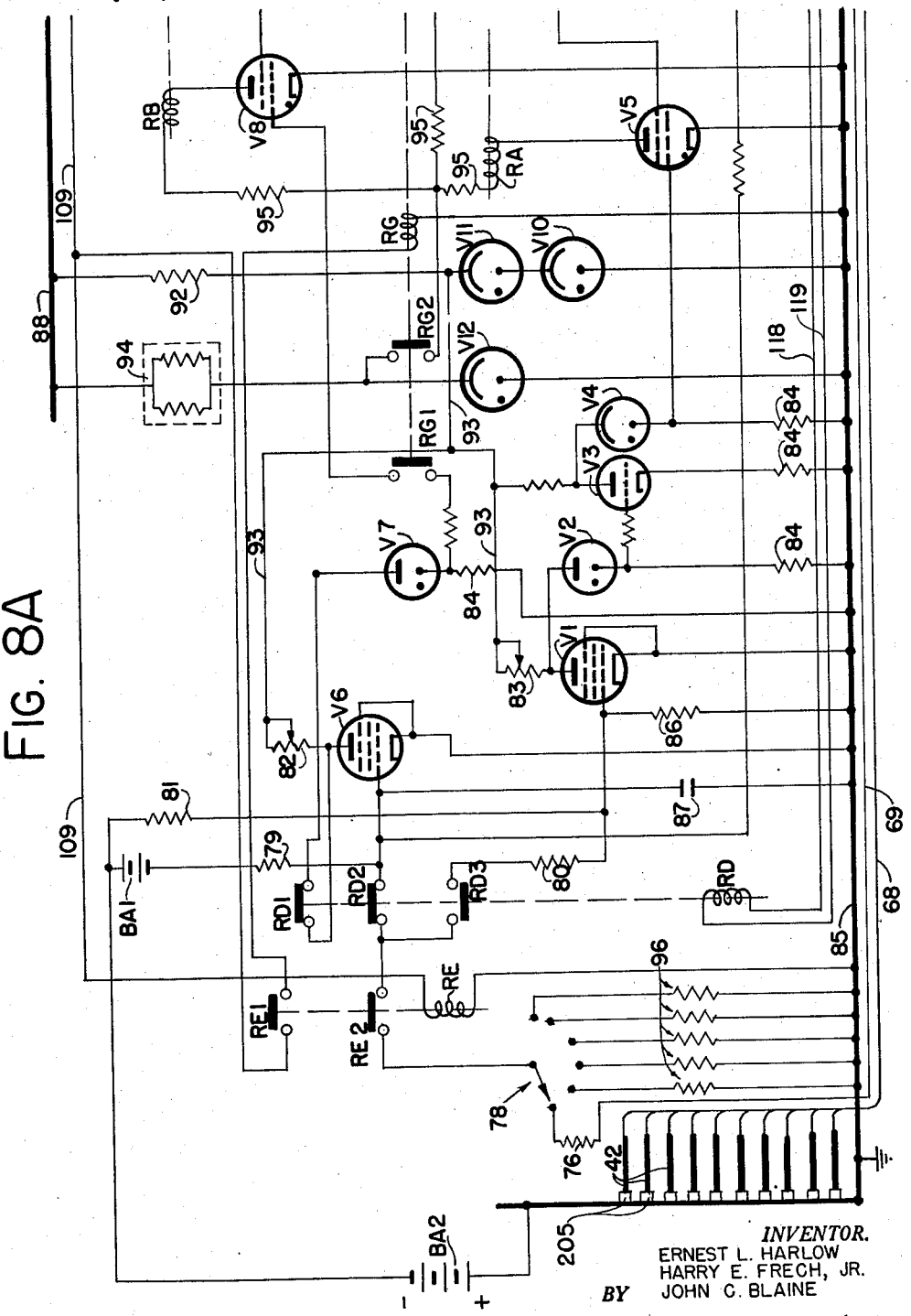

For the purpose of testing the electrical characteristic of the primer it is placed in series in a primary test circuit, Figure 8A, consisting of a suitable constant source of voltage impressed on resistances put in series with the primer 205 by means of the test probes 42 and various selector and control contactors. In order to test a primer with respect to the high limit of the test range, the primer 205, one end of which is grounded through the test block 21 and the rails 16, is put in series with a current limiting resistor 76 by means of one of the probes 42, a master rotary primer test selector switch 77, Figure 8C, a test-calibrate control switch 78, a normally open master test contactor RE2, a normally closed, relay operated, high test contact RD2, a resistor 79, a booster battery BA1 and a main test battery BA2, the other end of which is the positive pole, which is also connected to ground, Figure 8A. Batteries BA1 and BA2 are connected additively. In order to test the primer with respect to the low limit of the test range, the primer 205, still in series with the resistor 76, again by means of a probe 42 the master rotary primer test selector switch 77, the test-calibrate switch 78 and the contactor RE2, is now put in series with another resistor 80 and the resistor 81 and the main test battery BA2 by means of the normally open, relay operated, low test contactor RD3. Resistor 76 in series with resistor 79 and also resistor 76 in series with resistors 80 and 81 are of such value as to not only give the desired division of a voltage drop for application to the test circuit but to also limit the test current transversing the primers undergoing test to an operable and safe value unlikely to fire any of the primers. It is to be noted that one side of high test contactor RD2 is connected to one side of the resistor 79 and also to the grid of the high test control tube V6 (6AG7 power amplifier, for example) which is also connected to the same side of the resistor 79 and that one side of the low test contactor RD3 is connected through the resistor 80 to one side of the resistor 81 and also to the grid of the low test control tube V1 (6AG7 power amplifier) which is also connected to the same side of resistor 81. Thus the primer under test together with the various resistors and batteries constitute a voltage divider circuit from which a vacuum tube grid control voltage is applied to the grids of the high and low test tubes V6 and V1 in accordance with variations in the resistance of the primer in the test circuit. This places a grid bias from the batteries upon tubes V6 and V1 which affects the plate currents of tubes V6 and V1 flowing through the variable potentiometer resistors 82 and 83, respectively, by means of which both coarse and fine adjustment is obtained for setting the high and low reject limits, respectively. The high reject electronic test circuit comprises the control vacuum tube V6, the gas diode V7, the normally open relay operated grid contactor RG1, and the thyratron V8. The low reject electronic test circuit comprises the vacuum control tube V1, the gas diode V2, the grid controlled vacuum tube V3, the gas diode V4 and the thyratron V5. The electronic test circuit also includes a transfer thyratron V13 and the normally open, relay operated, thyratron reset contactor RG2. The electronic circuit also includes various cathode resistors 84 which connect their respective electronic tubes to the ground line 85, the grid leak resistor 86 and the grid capacitor 87 also connected to the ground line 85. Basically the test circuit constitutes an improvement on the circuit shown in the Frankford Arsenal Report No. R–1055 by R. S. Zelenka and E. Roffman, December 1951.

The power supply for the plate voltage of the electronic test circuit, existing between the ground line 85 and the B supply line 88 and also the power supply for the various electronic tube filaments (not shown) is derived from the electronic test circuit power supply 74 connected across the power lines 90 and 91 of the machine, Figure 8B. Plate voltage, after a suitable drop through resistor 92 and with voltage regulation by means of gas filled diodes V10 and V11 in series, is derived from the B supply line 88 for tubes V1, V2, V3 and V4 and also the tubes V6 and V7 by means of the line 93. Plate voltage for the thyratrons V5, V8 and V13 after suitable drop through resistor 94 and with voltage regulation by means of the gas filled diode V12 is likewise derived from the B supply line 88 through the contactor RG2 and the various plate resistances 95. Screen grid bias voltage for the thyratrons V8, V5 and V13 is obtained by way of the resistance units 115, 116, and 117 respectively from the supply line 89. Unit 117 is especially important in adjusting transfer thyratron V13 to operation properly at a desired intermediate value of primer resistance.

Closely associated with the electronic test circuit are the relay coils RE, RG, RB, RD, RH and RA, Figure 8A. Relay RE operates contactors RE2 and RE1; RG operates RG1, RG2 and RG3; RB operates RB1 and RB2; RD operates RD1, RD2 and RD3; RH operates RH1; and RA operates contactors RA1 and RA2.

The test circuit, for the purpose of checking on its proper operation and thereby precisely calibrate the circuit, also includes a number of resistors 96 connected between the test-calibrate switch 78 and the ground line 85. During normal testing operation this switch 78 is connected to one end of the resistor 76, the other end of which is connected to the moving contact of switch 77 by line 69.

The machine also includes a totalizing counter and visual indicator 97, a high reject counter and visual indicator 98 and a low reject counter and visual indicator 99 all three of which are mounted on the front panel of the controller cabinet 75. These counting and indicating devices are connected by contacts RC1, RB2, and RA2 respectively across the power lines 90 and 91 of the machine, Figure 8B, and are controlled by the normally open contacts RC1, RB2 and RA2 provided the contacts of the normally closed primer sensor limit switch LS5 are closed. Switch LS5 is mounted on the frame and has a follower which is operated only when the test and transfer block 41 has descended too far in the event that no test plate 21 or an empty one is located at the test station.

Also connected across the power lines 90 and 91 of the machine is a power indicator 100, the blower motor 101 for the cabinet 75 and the time delay relay coil RT, which operates in such a manner as to cause the normally opened contactors T1 and T2 to close only after a desired time delay during which the electronic test circuit, after closure of the machine's main power switch S1, can warm up to its normal operating temperature which is necessary for accurate operation of circuits of this type. Contactor T1 energizes the warm up indicator 102 while contactor T2 permits energizing the clutch solenoid 6. Main motor relay RM operates to close the normally open motor contactors M1 and M2 of the motor 3 which is connected across power line 90 of the machine and the other power line 103 leading as a power source to switch S1. Relay RM also closes the normally opened contact M3 which throws the master test lead and electronic circuit selector mechanism operating rectifier 104 across the power lines 90 and 103, Figure 8C, which are connected to a suitable source of power by a double pole master switch not shown at the right extremity of each of the lines 90 and 103. Time delay contactor T2 will however only operate to energize the clutch 5 when either the manual control switch S2 or the normally closed limit switch LS3, in parallel with S2, is closed.

The master test lead and electric circuit selector and control mechanism, Figure 8C, consists of a suitable gang of electric switching elements operated in synchronism with each other and with the mechanical movements of the machine. In this embodiment the mechanism consists of a gang of rotary switching elements accompanied by a rotary homing contactor 106 all of which are mounted in tandem with suitable alignment on a switch shaft operated by a rotary solenoid whose coil 105 is energized by the rectifier 104, provided either the normally open limit switch LS1 is closed as determined by the cam 10 or provided the normally open limit switch LS4 is closed in series with homing contactor in its closed circuit position. When energized, solenoid 105 indexes the homing contactor 106, the thyratron reset switch 107, the probe selector switch 77, and the air valve control switch 108 together each one station at a time. Homing contactor 106 and the switches 77, 107 and 108 are multi-station devices each having a relatively large and equal number of stations such as twelve. The number of stations of each must equal at least the number of primers that are to be tested during each cycle of the machine plus an additional rest station corresponding to the end of the cycle from which the contactor of each of these devices can advance to the No. 1 station upon commencement of the cycle of operation. The rotary contact of the probe selector switch 77, Figure 8C, is connected to one end of resistor 76, Figure 8A, while contactor No. 1 of this switch is connected by leads 68 to the head 67 of probe No. 1, Figure 8A; and in similar fashion successive contacts of the probe switch 77 are connected to successive probes 42 of the test head 41. Thyratron reset switch 107 serves to successively make and break the connection between the B supply line 88 and the relay supply line 109. When thyratron switch 107 closes upon a station, relay coils RE and RG and RH in the electronic circuit are energized and the totalizing counter relay coil RC is energized each time a primer is tested. RG, when energized, serves to close contact RG2 and place operating plate voltage on the thyratrons V8, V5 and V13; and when reset switch 107 breaks the circuit to deenergize relay RG, contactor RG2 returns to the normally open position so as to extinguish conduction in the thyratrons V8, V5 and V13 resetting them for testing the next primer. The primer acceptance selector air valve control switch 108 likewise has a number of stations corresponding with those of the probe selector switch.

The rotary contact of this switch 108, Figure 8C, is in series through line 111 with the relay controlled normally open contactor RH1 and with normally closed contactors RB1 and RA1, Figure 8B, which are connected in series with each other. The other end of the series of contactors RB1 and RA1 is connected to an intermediate power line 110 which is connected to the main power line 103 by means of the normally closed limit switch LS2.

Each one of the contact stations of switch 108 is connected to one end of one of a number of air valve control relays R301, R302–R310 which are in number as many as the number of probes 42. Relay coil R301 operates a normally open contactor 301A and a normally open contactor 301B. Similarly all the other relays such as R310 operate their respective contacts such as 310A and 310B. The normally open contactors 301A, 302A–310A, when closed by their respective relays short out the contact made at the switch 108 as well as at contacts RH1, RB1 and RA1 and maintain their respective control relays energized after the rotary contact of switch 108 has left the switch contact station corresponding to the particular control relay involved, provided either of the contactors RA1 or RB1 has not been opened to indicate a rejection. As a result one or more of the normally open contactors such as 301B, 302B–310B one end of each of which is connected to the intermediate power line 110 and the other end is connected with the respective solenoid coils 401, 402–410 of the normally closed solenoid operated air valves 501, 502–510 respectively may be closed. When limit switch LS2 is closed and all the contacts 301B, 302B–310B are also closed all of the individual air valves 501, 502–510 are held open until such time as one or more of the normally open contacts 301B, 302B–310B are left opened as a result of one or more rejections. On the other hand even though all of these normally open contacts remain closed all of the individual air valves will close simultaneously when limit switch LS2 is opened when the test head 41 is poised over the accept station 202 in the downward position for depositing the acceptable primers selected. As pointed out hereinbefore the air valves 501, 502–510 admit air from the manifold 60 to which air in turn is admitted provided the main air valve 15 operated by cam 14 is opened.

In order that air valve control switch 108 may not actuate the individual air valves before either of contactors RA1 and RB1 has been set as determined by a state of acceptance or rejection of the primers undergoing tests, the apparatus includes the normally open contactor RH1 which is actuated by the delay relay RH which is also connected across the lines 109 and 85 and which in turn is energized upon closure of the normally open contactor RG3 operated by relay RG. When contact RG3 is closed and before contact RH1 is closed, the electronic test circuit is given an opportunity to operate the contactors RB1 and RA1. Consequently when RH1 closes after the rotary contact of switch 108 has arrived at a switch station, the contactors RB1 and RA1 determine whether or not a particular valve control relay will serve to accept or reject the primer under test.

Figure 6:
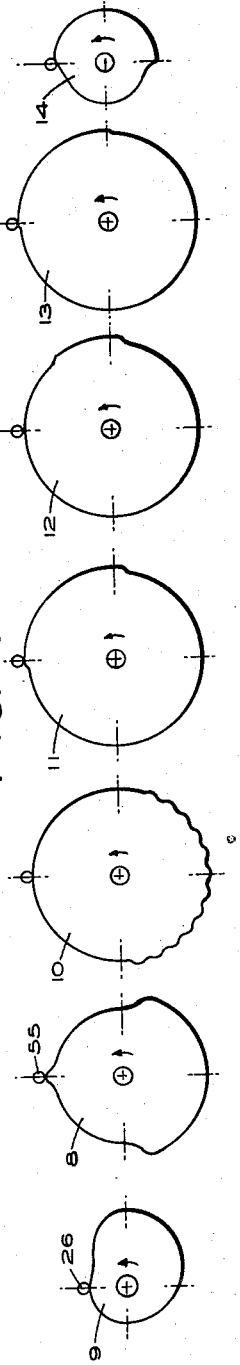
Figure 6 is a view showing the shape in detail and relative alignment of various of the cams of the machine.

Synchronization of the mechanical and electrical features of the machine of this invention and operation of the machine with the desired sequence and positioning is obtained by means of the array of cams mounted on the main shaft 2 all of which, with the exception of the test head operating cam 7 are shown in Figure 6. The test head operating cam 7, the probe operating cam 8, and the indexing ratchet cam 9 coact with suitable followers to give desired mechanical movements and the main air valve cam 14 operates the main air valve 15 with the movement and timing shown in Figure 7. The remaining cams 10, 11, 12 and 13 operate the electric control switches LS1, LS2, LS3 and LS4, respectively, shown in Figures 8B and 8C and also shown in association with their respective cams in Figure 2.

In order to energize the machine, main power switch S1 is closed normally after the master switch has been closed to immediately start the cooling blower motor 101, energize the motor relay RM to close contacts M1 and M2 thus starting the main drive motor 3 and to also close contact M3 energizing the rotary solenoid power supply 104, and to actuate the time delay relay coil RT which after a suitable warm up time closes the contactor T2 which in turn permits actuation of the clutch solenoid 6 when manual switch S2 is closed. Then with switch S1 closed, the electronic test circuit power supply 74 is immediately energized and the counter circuits and their normally opened control contactors RA2, RB2 and RC1 arranged in series relationship are connected to the power lines 91 and 90 are set for operation by relays RC, RB and RA respectively provided the limit switch LS15 is not open. The energized motor 3 normally operates the main shaft 2 continuously at a suitable adjustable speed and all the mechanical and control components are put into full operation in cooperation with the testing circuits. Main switch S1 is ordinarily left closed until it is desired to throw the entire machine out of operation for an appreciable period such as occurs between work shifts. Whenever it is necessary to make a temporary halt in the operation of the machine for adjustment, observation, or a change in production, manual control switch S2 is operated to disengage clutch 5 while the rest of the machine remains in operating condition.

In preparing the apparatus for operation, the space between pusher bars 24 in the entry area 20 is loaded with perforated test plates or blocks 21 each containing an array of untested primers in a column and row arrangement, and similarly spaces between the pusher bars 24 in the receptacle guideway 22 are loaded with receptacles or containers 23 having recesses in an arrangement corresponding with the arrangement of the test plates. The operator continues to load test blocks and empty receptacles or containers at the loading station 200 of the apparatus during the operation of the machine.

In the operation of the apparatus, the indexing mechanism advances the roller chains 25 and the pusher bars 24 together with the test plates 21 to bring a group of ten untested primers up to the test station 201 at each indexing step and the cross feed mechanism translates the test and transfer slide 40 and its block 41 containing probes 42 back and forth between the test station 201 and the accept station 202, Figure 2. At each of these two stations the probe actuator mechanism reciprocates the block 41 vertically with desired motion so as to accomplish electrical contact with the primers and vacuum pick-up of acceptable primers at the test station, and release of the accepted primers at the accept station at which the receptacles or containers 23 are loaded and then pass on to a delivery station 203 where another operator can visually determine whether or not there are any recesses in receptacles 23 to be filled with acceptable tested primers in replacement of defective primers which were left in the testing plate 21 at the test station. While the group of ten primers are at the test station the electrical testing of all of them is done practically instantaneously by the apparatus after which the pneumatic circuit of the apparatus makes the necessary selection of acceptable primers, leaving the defective primers as a residue in test plates 21 which pass on from the test station to a reject station 204, Figure 2. In the meantime the indexing mechanism has made a return and again indexes the roller chain and pusher bar conveyor to bring up the next group of ten primers to be tested.

In this embodiment of the testing and assorting machine, the conveyor test plates and receptacles are especially suitable for operations wherein articles are to be taken from shipping trays and are to be replaced after testing in those trays with the same orientation as they had originally. An operator or a suitable mechanism need merely overturn a tray of untested primers into a suitably recessed test plate 21 at the loading station 200 and after testing need merely overturn the receptacles 23 arriving at the delivery station 203 into the empty trays.

Preparatory to testing, the machine is calibrated first with a preliminary rough adjustment and with a finer adjustment. The preliminary calibration is accomplished with precision calibration resistors 96 and the adjustable plate resistors 82 and 83, Figure 8A. First one of the resistors 96 at the high side of the range desired is selected by means of the test-calibrate switch 78 and the variable plate resistor 82 is adjusted until the apparatus shows a reject response. Next one of the resistors 96 on the low side of the desired range is selected and put into the test circuit and the variable plate resistor 83 is then adjusted until the apparatus registers a reject response. The final calibration is obtained by means of a test block or test blocks similar to test plates 21 but containing banks of standard precision resistor elements in groups of ten rather than the untested primers 205. For example, one bank consists of ten equal precision resistors having a value such that all ten should be rejected as too high in value. Another bank consists of ten equal precision resistors of somewhat lesser high value all of which are acceptable and should cause the machine to register complete acceptance when the high reject circuit is properly calibrated. Still another bank of standard calibration resistors consists of ten precision resistors of a given low value all of which are unacceptable and will cause the machine, when properly calibrated, to register a reject response. A final bank of calibrated resistors consists of ten equal precision resistors of somewhat higher low value all of which are acceptable and which cause the machine when operated with proper calibration to register an accept response. In practice each bank consists of a single resistor to which ten sets of connections are made. This check unit arrangement provides the machine with rather clearly defined upper and lower limit response points. This final calibration arrangement of the check unit takes into account the length of all leads, all contact resistances and any variation in the probe contact occasioned by wear.

The electronic test circuit consists of a high reject circuit which operates to reject all primers above a certain upper limit and to accept all primers below that limit but above an intermediate value of resistance as determined by the operation of the transfer thyratron V13. The low reject portion of the circuit operates to accept all primers having a resistance below this intermediate value but above a certain lower limit and to reject all primers having a resistance below this lower limit. Thyratron transfer tube V13 is operated in such a way, as determined by the screen grid voltage obtained through potentiometer 117 from line 89, that it will not fire until the negative voltage on control grid 120 of V13 is reduced; and therefore it remains in a non-conducting state until a primer having a resistance below the aforementioned intermediate value is placed into the circuit. With any value of a primer above this intermediate value, the negative bias of transfer thyratron V13 is high enough to prevent firing of it. If the primer resistance is between the upper limit and the intermediate value, the primer is accepted and the low reject portion of the circuit is not brought into electrical association with the primer at all. But, if the resistance of the primer being tested is less than the intermediate value, then the thyratron transfer tube V13 fires and energizes relay RD which opens contactor RD2 to disconnect the primer from the high reject portion of the circuit, closes contactor RD3 to put the primer across the low reject portion of the circuit and simultaneously opens the normally closed contactor RD1 so as to extinguish the gas tube V7 to prevent the high reject circuit from registering a reject on account of opening of the normally closed contactor RD2. At this stage of the operation of the test circuit the primer is put to the second half of the test to determine whether its resistance falls within the lower part of the acceptable range but not below the lower limit.

With a test block or plate 21 at the test station 201, the first group of untested ten primers is contacted by the test probes 42 as the probes together with the test and transfer block 41 are moved to the lowest position by the probe pusher plate 43. When probes 42 are in contact with the primers 205, Figure 8A, the test probe selector switch 77 makes contact in succession with each of the probes in a predetermined order. Simultaneously the thyratron reset switch 107 first makes and then breaks the connection which applies plate voltage to the thyratron as a result of the action of relay RG and simultaneously the air valve control switch 108 makes contact successively with the control relays R301, R302–R310, Figure 8C.

With the thyratron reset switch 107 closed at a station, relay RE is energized without fail before relay RG is energized on account of the positive interlock obtained by means of contactor RE1. When energized, relay RE closes the normally opened contactors RE1 and RE2 which causes relay RG to be energized and the first primer of the series of ten undergoing tests to be connected with one side of each of the contactors RD2 and RD3 which control the connections with the electronic test circuit. Relay RG closes contactor RG2 to put plate voltage across thyratrons V8, V5 and V13 and also closes contactor RG1 which until it is closed prevents the normally conducting gas tube V7 from energizing the reject relay RB prematurely before RE2 contactor has had an opportunity to close and place a primer in the test circuit. Relay RG also operates control RG3 to energize delay relay RH.

When the primer undergoing test is of acceptable value neither relay RB nor relay RA is energized so that contacts RB1 and RA1 respectively remain closed and therefore maintain a closed circuit through delay contact RH1 and lines 110 and 111 up to the air valve control switch 108 upon delayed closure of contactor RH1. In further response to this situation normally open counter-contactors RB2 and RA2 remain open to indicate no rejects of any kind while the totalizing counter-contactor RC1 is closed pursuant to the operation of the thyratron reset switch 107 as it advances from station to station, provided sensor switch LS5, Figure 8B, remains closed in accordance with its operation hereinbefore described.

An acceptable primer results in a negative grid bias on the high test amplifier V6 which is low enough to cause it to conduct heavily. The resulting increased voltage drop across plate resistor 82 puts a plate voltage through contactor RD1 on tube V7 sufficiently low to maintain its conduction at such a low level that the potential differences across its cathode resistor which is applied to the grid of the relay operating thyratron V8 through contactor RG1 is not sufficient to cause thyratron V8 to fire. If, however, the resistance of the primer under test is above the high limit, the resultant negative grid bias on the high test amplifier V6 is so high as to hold the plate voltage of amplifier V6 high enough to keep tube V7 conducting at a high enough level to produce a positive voltage drop at the cathode resistor applied on the control grid of thyratron V8, with contactor RG1 closed, which causes thyratron V8 to ionize, energizing the reject contactors RB1 and RB2 the latter of which causes an indication of a high reject at the device 98.

If the primer is acceptable and its resistance value is above the intermediate value referred to hereinbefore no further operation occurs in the electronic test circuit of this machine. But if the resistance of an acceptable primer falls below the intermediate value, then as a result of the operation of the transfer thyratron V13 contactors RD1 and RD2 are opened while the normally opened contactor RD3 is closed by the relay RD placing the primer in the circuit to test for the low limit. The opening of RD1 prevents tube V7 from actuating the high reject relay RB as a result of the apparent high resistance occasioned by the opening of contactor RD2. If the resistance of the primer is still acceptable, the resultant negative grid on the low test amplifier tube V1 is sufficiently high to hold the plate voltage high enough to keep the tube V2 conducting at a level which maintains the positive potential difference across its cathode resistor, applied to the grid of vacuum tube V3 sufficiently high to produce such a low plate voltage across the vacuum tube V3 as to be insufficient to keep the gas diode V4 conducting. As a result the normally non-conducting high reject relay operating thyratron V5 does not energize relay RA and the low reject contactors RA2 and RA1 remain open and closed respectively, the latter of which maintains a closure in the circuit through the air valve control switch 108. If on the other hand the resistance of the primer is below the lower limit, the resultant negative grid bias on tube V1 is less than is necessary to keep gas diode V2 conducting. Low test amplifier V1 will only in this instance conduct more heavily and the common plate voltage of amplifier V1 and diode V2 will drop below that needed to keep the diode conducting. This increases the plate voltage of tube V3, which in turn fires tube V4 and puts a positive voltage on the grid of the thyratron V5 causing it to conduct and energize the low reject relay RA and the reject contactors RA1 and RA2 the latter of which causes an indication of a low reject on the device 99.

When either of the contactors RB1 or RA1 is opened as a result of the resistance of the primer being out of the acceptable range, the electrical circuit to the air valve control switch 108 is opened. On open circuit, control switch 108 even after closure of contactor RH1 cannot operate to energize any particular one of the air valve control relays R301, R302–R310. As a result a particular one of the normally open air valve solenoid controlling contactors 301B, 302B–310B remains open and this condition of the solenoid controlling contactor allows a particular one of the normally closed air valves 501, 502–510 to remain closed. However, when primers under test are acceptable, contactors RB1 and RA1 remain closed and, provided the normally closed limit switch LS2 has not been opened by the solenoid reset cam 11, air valve control switch 108 acts to complete the circuit to relays R301, R302–R310 which in turn when energized close holding contactors 301A, 302A–310A and simultaneously close control contactors 301B, 302B–310B. It will be noted that any failure of power or failure of a connection will automatically cause the machine to reject and it will also be noted that only acceptable primers allow their corresponding air valve controlling contactors to remain closed to energize their respective air valve solenoids 401, 402–410 which in turn maintain their respective normally closed air valves open. Thus when the testing of the entire group of ten primers is completed the group of ten air valves will be variously open or closed in accordance with the resistance of the individual primers. In this part of the cycle, when the main air valve 15 is actuated by the air valve cam 14, air under pressure from the manifold 60 is either admitted or cut off by means of the individual air valves from the flexible air lines 61 leading to the aspirators in the test and transfer block 41. Thus pick-up suction will be applied only to the acceptable primers at the suction pad 66; and when the block 41 is elevated from the test station and transferred to the accept station only the acceptable primers will be carried over and deposited in the receptacles 23 after the test head has descended at this station and the suction pressure cut off with respect to all of the primers as a result of the action of the main valve 15 under the actuation of the valve cam 14 at the desired place in the test cycle. It is to be noted that when the test and transfer block 41 elevates, pressure on the test probes 42 is immediately relieved so as to apply no force to the accepted primer which would tend to counteract the suction force and cause acceptable primers to remain in the test plate at the test station to pass on with the rejected primers to the reject station.

The machine includes a booster battery BA1 in the test circuit which enables the high test vacuum tube V6 which is more heavily operated than the low test vacuum tube V1 to be operated at a lower level of average plate current. With this arrangement or the equivalent, the high test vacuum tube V6 is given a prolonged life comparable to that of the low test vacuum tube V1. In the absence of this new and improved arrangement the heavily loaded tube V6 will fail at frequent intervals and impair the usefulness of the machine.

By means of the booster battery BA1 the level of average plate current in the high test amplifier V6 is reduced. Since V6 unlike tube V1 operates for every primer being tested and conducts most heavily when the primer resistance is acceptable, which is the most frequent condition of operation, it will be appreciated that amplifier V6 is operated at or near capacity most of the time and is more likely to become unstable than amplifier V1. Consequently inclusion of battery BA1 has been found to improve the stability and life of the most heavily loaded vacuum tube of the test circuit and thereby minimize the occurrence of a breakdown in the test apparatus. Furthermore by means of this improvement which involves essentially increase of the average negative grid bias on the amplifier V6, the operating point on the $I_p$–$E_p$ characteristic curve of this thermionic valve is changed with respect to the load line to obtain test operation with improved reliability and accuracy as a result of the increased linearity and sensitivity of response.

Figure 7:
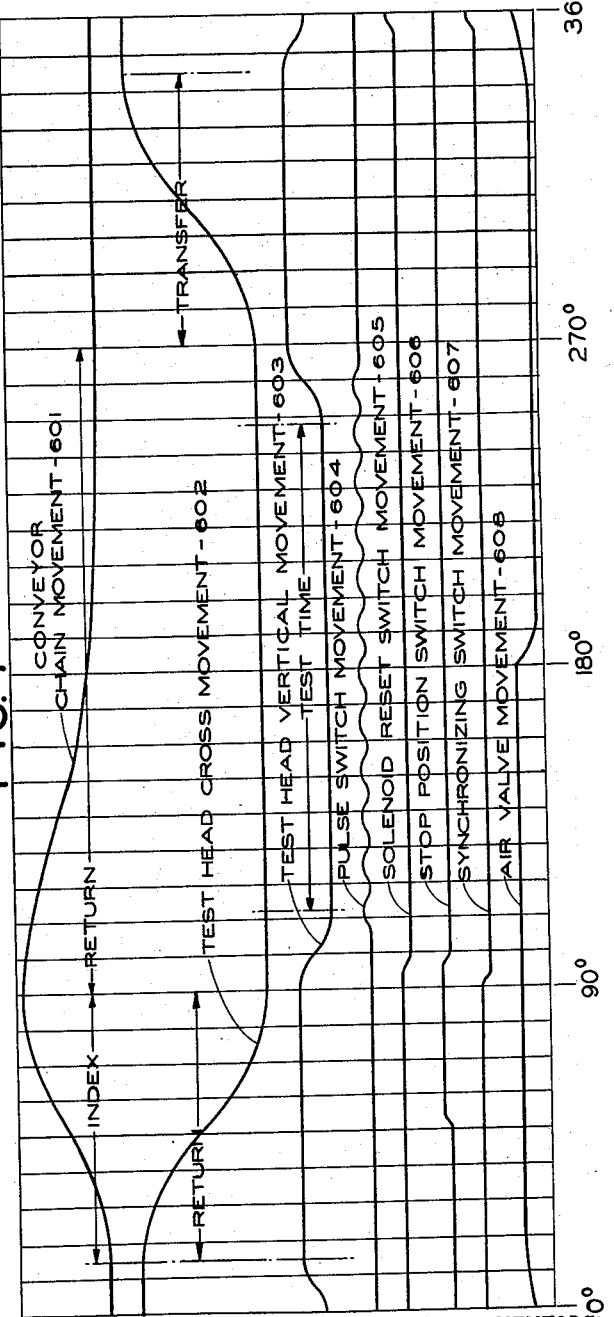
Figure 7 is a timing diagram of several of the operations of the machine.

The synchronism and interlocking of the operation and controls of this machine are best described in connection with the timing diagram, Figure 7. In the diagram is shown the approximate relative times at which the cams associated with several of the details of the machine actuate these details and the relative times the conducting portions of the testing operation as determined by the sequence switches are in operative association with the test probes as compared with each cycle of operation of the turret or roller chain conveyor. A single cycle of operation is shown over a span of 360° wherein the 90° position corresponds with the position at which the test and transfer block 41 is completely elevated and poised over the test station. Graph 601 shows that cam 9, Figures 2 and 6, associated with the indexing mechanism causes the conveyor to index during less than a quarter of the cycle which is ahead of the 90° position and that the indexing ratchet pawl 33 undergoes a return movement thereafter for the ensuing 180° of the cycle. The pusher bars 24 are advanced in accordance wtih the conveyor chain movement for only about 75° of the cycle and remain stationary for the remainder of the cycle until the 15° position is again arrived at by the indexing ratchet operating cam 9. Graph 602 shows the relative time of transverse movement of the testing head or block 41 under the actuation of the rotatable cylindrical cam 7. The graph shows that the transverse return movement is accomplished simultaneously with the indexing movement of the conveyor and indexing ratchet. From the 90° position the test head 41 rests for 180° of the cycle. At the 270° position the test head accomplishes the transverse transfer movement from the test station 201 to the accept station 202. Graph 603 shows the vertical movement of the test head 41 as actuated by the cam 8. As shown, the test head is in the completely elevated position during the transfer and return movements of it. At the 90° position, the test head 41 and all of the test probes 42 carried in the head are completely depressed in about 20° of the cycle and remain depressed for about 140° of the cycle as the test head remains otherwise stationary over the test station during which period the resistance testing is accomplished by the machine during the time designated as the test time. As shown, the test head, after it has been transferred over the accept station at about the 345° position, moves downwardly from the upper position only partially, stopping at a level spaced above the receptacles of the accept station at the 360° position, after which the test head again returns to the uppermost position which is prior to commencement of the transverse return movement shown in graph 602. Graph 604 shows the relative times of actuation of the pulsing switch LS1 occurring during the test time. As shown, the normally open switch LS1 actuated by cam 10, Figure 6, is closed at least ten times corresponding to the ten test probes 42 and the ten primers undergoing tests. The extra lobes on graph 604 merely indicate that with suitable change more than ten articles can be tested by means of this apparatus. Graph 605 shows the movement of normally closed reset switch LS2 actuated by cam 11 to be opened at the 0° or 360° position and remain open up to the 100° position. From the 100° position to the 360° position switch LS2 remains closed so as to enable energizing voltage to be applied across the air valve control relays and their contactors as shown in Figure 8C. At the 360° position, LS2 is moved open to allow all the air valves 501, 502–510 to close thereby causing primers transferred from the test station to be deposited at the accept station. Graph 606 shows the movement of the normally closed stop positioning switch LS3, Figure 8B, which is actuated by the cam 12. LS3 is opened at about the 50° position and closes at about the 100° position at which the test head 41 is poised over the test station and has just begun to move downwardly. Switch LS3 thus has a homing function and insures that the machine will always stop at a convenient and identical position no matter at which position in the cycle the manual control switch S2 may be opened. Graph 607 shows the movement of the normally open synchronizing switch LS4 actuated by the cam 13. As shown, switch LS4 is closed at about the 0° or 360° position and remains closed up to the 90° position. During this period LS4 is in series with the homing contactor 106 and serves to put it into effective operation in the event that for any reason the rotary solenoid operated test lead and electric circuit selector mechanism shown in Figure 8C has not arrived to the rest position of station No. 12. Between the 90° position and the 300° position of the cycle, switch LS4 remains open so as to prevent the homing contactor 106 from shorting out the pulsing switch LS1 and leave it ineffective for the purposes of this invention. Graph 608 shows the movement of the main air valve 15 actuated by cam 14. From the 0° position to the 180° position of the cycle, valve 15 remains closed inasmuch as air is not needed and should be conserved for this portion of the cycle. At the 180° position, valve 14 is opened and admits air pressure to the manifold 60 which feeds the individual air valves in accordance with the positions of the controller relay contactors 301B, 302B–310B as determined by the resistances of the individual primers undergoing test. At the 360° position of the cycle or somewhat thereafter, main air valve 15 is closed to cut off the pick-up suction entirely.

In the above specific example, the present invention is described in connection with testing and assorting of primers but it should be understood that the invention is likewise applicable to other devices. Likewise, although the testing of a group of ten primers has been described, a greater number may be included in the group by appropriately changing the number of probes 42 and other complementary components.

This invention accordingly provides new and improved means for testing and assorting articles with a high degree of precision and safety and with economy and speed suitable for mass production of articles of the type described. In the event that any operational failure occurs such as an electrical failure, the machine acts to reject rather than to accept the articles fed to it so that danger of passing of defective articles is virtually eliminated.

Since many other embodiments of this invention may occur to those skilled in the art, it is to be understood that the embodiment of the present invention as shown and described is only illustrative of a preferred embodiment and is not intended as a limitation of the scope of the invention except as set forth in the appended claims.

What we claim is:

1. An apparatus for testing and assorting electroconductive articles of the type described comprising indexing means for positioning articles to be tested, means for supporting a group of articles to be tested, a test station in line with the path of travel of said articles carried by said support means, movable means for engaging with said articles on said support means said movable means having orifices communicating with the points of engagement of said movable means with said group of articles for applying suction to said articles of a group selectively, probe means carried by said movable means into electroconductive engagement with all of said group of articles, a test circuit including said probe means for detecting variations in the electroconductivity of each of said articles from an acceptable range, a series of valve means for controlling the suction applied to said orifices individually, means responsive to said test circuit when a given article is detected as acceptable for controlling the opening of the valve means corresponding to said article of said group thereby applying suction to the acceptable primer sensed by the test circuit, means for mobilizing said movable means and the probe means toward and away from said support means at said test station and at an accept station, means for translating said movable means back and forth between said test station and accept station, and means responsive to the position of said movable means when poised over said accept station and moved into slightly spaced juxtaposition therewith for causing said valve means to cut off suction at all of said orifices, thereby depositing all of the groups of articles found acceptable at said accept station.

2. An apparatus for testing an electric property of articles and for assorting them accordingly, comprising an electric test circuit for detecting variations in said property from an acceptable value, conveyor means for transporting articles to be tested in groups, movable probe means for electroconductively connecting said groups of articles in succession with said test circuit, selector switch means between said test circuit and said probe means for connecting articles of a given group sequentially in predetermined order with said circuit, means for transferring tested articles found to be acceptable from said conveyor means, said transfer means mounted to move toward and away from a group of articles undergoing test and having pneumatic means supported thereon and responsive to said test circuit to pick up acceptable articles and release all of the acceptable articles after said movement away from said group and means to drive said conveyor means and article transfer means in synchronism with each other and with said probe means.

3. An apparatus for testing and assorting electroconductive articles of the type described comprising a traveling electroconductive test plate having article receiving recesses therein arranged for receiving groups of said articles in identical number and arrangement, a movable test block having acceptance pick up means corresponding in arrangement and number to each of said test plate recesses of any one of said groups, a series of movable electrical contact means carried by said test block urgeable toward said test plate at a test station, said contact means also corresponding in arrangement and number to said recesses of a group, means for urging said test block and contact means toward a test plate at said test station in such a manner as to place the pick up means and contact means substantially into contiguity with a group of articles, test means for detecting variations in the electroconductivity of said articles from an acceptable range, selector switch means in series with said contact means, articles, test plate and test means for connecting the articles of said group sequentially in a predetermined order to said test means, means conditioned on detection of acceptable articles by said test means for actuating said pick up means in the same predetermined order, means for withdrawing both said test block and electrical contact means away from said test plate, means for moving said test block and the articles picked up by it from said test station to an accept station, and means for effectuating release of said transferred articles at said accept station, and means to operate said urging and withdrawal means, selector switch means, transfer means and release means in synchronism with each other in the order set forth.

4. An apparatus for testing and assorting electroconductive articles of the type described comprising a traveling electroconductive test plate having article receiving recesses therein aranged for receiving groups of said articles in identical number and arrangement, means for positioning said plate at a test station, a movable test block having suction pick up means corresponding in arrangement and number to each of said test plate recesses of any one of said groups, a series of movable electrical contact means carried by said test block urgeable toward said test plate at said test station, said contact means also corresponding in arrangement and number to said recesses of a group, means for urging said test block and contact means towards a test plate at said test station in such a manner as to place the pick up means and contact means substantially into contiguity with a group of articles, test means for detecting variations in the electroconductivity of said articles from an acceptable range, selector switch means in series with said contact means, articles, test plate and test means for connecting the articles of said group sequentially in a predetermined order to said test means, means included in said test means and responsive to detection of unacceptable articles for maintaining said pick up means ineffective, means responsive to detection of acceptable articles by said test means for actuating said pick up means in the same predetermined order, means for normally withdrawing both said test block and electrical contact means away from said test plate upon cessation of action of said urging means, means for moving said test block and the articles picked up by it from said test station to an accept station, and means for effectuating release of said transferred articles at said accept station, and means to operate said urging and withdrawal means, selector switch means, transfer means and release means in synchronism with each other in the order set forth.

5. An apparatus for testing and assorting electroconductive articles of the type described comprising a traveling electroconductive test plate having article receiving recesses therein arranged for receiving groups of said articles in identical number and arrangement, means for positioning said plate at a test station, a movable test block having suction pick up means corresponding in arrangement and number to each of said test plate recesses of any one of said groups, a series of movable electrical contact means carried by said test block urgeable toward said test plate at said test station, said contact means also corresponding in arrangement and number to said recesses of a group, means for urging said test block and contact means toward a test plate at said test station in such a manner as to place the pick up means and contact means substantially into contiguity with a group of articles, test means for detecting variations in the electroconductivity of said articles from an acceptable range, selector switch means in series with said contact means, articles, test plate and test means for connecting the articles of said group sequentially in a predetermined order to said test group, contactor means included in said test means and responsive to detection of unacceptable articles for maintaining said pick up means ineffective, means responsive to detection of acceptable articles by said test means for actuating said pick up means in the same predetermined order, resilient means for withdrawing both said test block and electrical contact means prior to withdrawal of said test block away from said test plate, means for moving said test block and the articles picked up by it from said test station to an accept station, said means for urging said test block and contact means also urging said test block into closely spaced juxtaposition with a receptacle at said accept station, and means for effectuating release of said transferred articles at said accept station, and means to operate said urging and withdrawal means, selector switch means, transfer means and release means in synchronism with each other in the order set forth.

6. The apparatus of claim 3 wherein said movable test block includes a resilient pick up pad having orifices corresponding in arrangement and number to the number and arrangement of the articles of said group, each of said electrical contact means having resilient means for returning said contact means with substantially identical force, said means for urging said test block and series of electrical contact means in contiguity with the articles of said group including a deformable resilient pressure pad adapted to engage with each of said contact means.

7. In apparatus for testing and assorting electroconductive articles of the type described comprising conveyor means carrying a test plate having an array of article receiving recesses for transporting articles from a loading station to a test station, a test circuit, said test plate being in electroconductive relationship with one side of said test circuit and said articles, means for indexing said conveyor means between periods during which said conveyor means is at rest for advancing the articles to said test station by groups identical in number and arrangement of articles therein, a test head reciprocable between said test station and an accept station, a series of electrical contact means included in said circuit yieldably carried by said test head identical in number and arrangement with said array of recesses for a group, each of said contact means being movable into and out of engagement with said array of articles of a group, said test head having suction pick up means including a resilient deformable suction pad having orifices in number and arrangement identical with said array of a group of articles, a gang switch having contact means operable in unison, a pulsing switch successively operating said gang switch for progressively stepping it from station to station, normally closed electrically operated pneumatic valves for actuating said suction pick up means, normally open valve control contactors for actuating each of said valves, pneumatic control relays for operating said valve control contactors; said gang switch including a sequentially operable multi-station control switch for resetting said test circuit for each article undergoing tests, a sequentially operable multi-station switch for connecting said contact means in a predetermined order with said test circuit, a sequentially operable multi-station switch for energizing said pneumatic control relays, and a homing contactor in series with a normally open synchronizing contactor for preventing discontinuance of operation of said gang switch on closure of said homing and synchronizing contactors until it has again arrived at the initial position of the cycle of operation of the apparatus at which said contact means are positioned at said test station spaced from said array of group of articles; said valves, valve control relays and stations of said multi-station switches being in number identical with the number of articles of a group, a normally closed pick up valve reset switch for deenergizing all of said valve controller relays simultaneously thereby enabling release of all the acceptable articles selected by said test head, a main air valve, a main drive shaft motor operated with constant speed, said shaft having fixed thereon means for intermittently energizing said indexing means to accomplish the advance movement of said conveyor means before the initial position of the cycle is reached and when said test head and contact means are not in motion, means mounted on said main shaft for moving said test head from said test station to said accept station after the test period of a cycle of operation and before articles picked up by said test head are deposited at said accept station and for returning said test head to said test station before the initial position of the cycle of the apparatus is again reached and for maintaining said head at said test station during said test period and for maintaining the test head at the accept station during the time release of accepted articles is being accomplished at the accept station, means for urging said contact means and test head toward and away from test plates and receptacles at said test and accept stations respectively, means mounted on said main shaft for driving said contact and test head urging means so as to put said contact means and suction pad into contiguity with all the articles of a group at said test station during the test period, and to place said contact means and test head into closely spaced proximity with receptacles at said accept station, means mounted on said main shaft for actuating said valve controller relay reset switch to cut off the pick up suction and release articles at said accept station, means mounted on said main shaft for actuating said pulse switch a number of times corresponding to the number of articles in the group undergoing test at said test station, means mounted on said main shaft for opening said main valve and thereby energizing said pick up means pneumatically before said test head is withdrawn from a test plate at the test station at the termination of the test period, means mounted on said main shaft for actuating a said synchronizing contactor to prevent said homing contactor from shorting out said pulsing switch and rendering it ineffective before said test period is completed.

8. In apparatus for testing and assorting electroconductive articles of the type described having a test circuit including a first operating electronic circuit for detecting variation of said articles above and below a high limit of acceptance value of resistance, a second operating test transfer means for detection of whether the resistance value of said articles is above or below an intermediate value of resistance and a third operating electron circuit for detecting variation of said articles below and above a low limit of acceptance value of resistance, said transfer means being operable after said first operable circuit in response to detection of an article resistance below said intermediate value to transfer said article into test association subsequently with said third operating circuit, said first and third operable circuits each including a negatively grid biased article resistance sensitive thermionic amplifier, said amplifier of the first operable circuit conducting most heavily when the article resistance is below said high limit and said amplifier of the third operable circuit conducting most heavily only when the article resistance is below said low limit, and voltage divider circuits including an article for testing, the improvement comprising means in said divider circuits to limit the value of test current flowing in the articles to a value substantially insufficient to actuate said articles while maintaining the grid bias voltage, which includes the drop of voltage across the article undergoing test, applied to the amplifier of said first operating circuit more negative than the grid bias applied to the amplifier of said third operating circuit thereby reducing the average plate current of said first amplifier as compared to the average plate current on said second amplifier whereby the operating life of said apparatus and its stability and accuracy are improved.

9. In the apparatus of claim 8 wherein said first operating circuit, second operating test and transfer means and third operating circuit include relay operating thyratrons, and a relay for operating normally opened contacts which control the reset voltage applied to the plates of said thyratrons and the voltage applied to the positively biased control grid of the thyratron of said first operating circuit, the improvement comprising a second relay for actuating a normally open contact which upon closure energizes said first relay and for simultaneously actuating a normally open contactor connected in series between said article undergoing test and said circuits and the second operating test and transfer means whereby placement of the article to be tested in the circuits before closure of said thyratron reset contactor and thyratron grid contactor is assured with positive interlock.

10. An apparatus for testing and assorting electroconductive articles of the type described comprising means for positioning articles to be tested, an electroconductive test plate carried by said positioning means and recessed for containing at least one group of articles to be tested, a test station in line with the path of travel of said test plate moved by said positioning means, movable means for engaging with said articles in said test plate, said movable means having orifices communicating with the points of engagement on said movable means with said articles for applying suction to said articles of a group selectively, probe means carried by said movable means into electroconductive engagement with said group of articles at said test station, a test circuit including said plate and said probe means for detecting variations in the electroconductivity of each of said articles from an acceptable range, means for switching all of the articles of said group for inclusion sequentially in said test circuit, a series of valve means for controlling the suction applied to said orifices individually, means responsive to said test circuit when a given article is detected as unacceptable for maintaining each of said valve means corresponding to said given article closed, means synchronized with said switching means and conditioned on detection of an article as acceptable for opening the valve means corresponding to said article of said group thereby applying suction to the acceptable article sensed by the test circuit, means synchronized with said article positioning means for mobilizing said movable means and the probe means toward and away from said test plate at said test station and toward and away from a similarly recessed receptacle at an accept station, means synchronized with said article positioning means for translating said movable means back and forth between said test station and said accept station and means responsive to the position of said movable means when poised over said accept station and moved into slightly spaced juxtaposition therewith for causing said valve means to close, thereby depositing all of the groups of articles found acceptable at said accept station.

11. An apparatus for testing and assorting electroconductive articles of the type described comprising indexable means for positioning articles to be tested, a continuous succession of electroconductive test plates carried by said indexable positioning means and recessed for containing a plurality of groups of articles to be tested, said plates being in electroconductive relationship with one side of said articles, a test station in line with the path of travel on said indexable means of said test plates, resiliently mounted movable means for engaging with a group of said articles in said test plate, said movable means having orifices communicating with the points of engagement of said movable means with said group of articles for applying suction to said articles selectively, probe means resiliently carried by said movable means into electroconductive engagement with the other side of said group of articles, said probe means being telescopically mounted in said orifices electrically insulated from said movable means, a test circuit for detecting variations in the electroconductivity of each of said articles from an acceptable range, said circuit having one side connected to said test plates to include said plates in the circuit, selector switch means in said circuit for connecting said probe means in said circuit in predetermined sequence with the other side of said circuit, a series of valve means for controlling the suction applied to said orifices individually, means responsive to said test circuit when a given article is detected as unacceptable for holding closed the valve means corersponding to said article of said group thereby applying suction only to the acceptable primer sensed by the test circuit, means engaging said probe means for mobilizing said movable means and the probe means toward and away from said test plate at said test station and toward and away from a similarly recessed receptacle at an accept station, means for translating said movable means back and forth between said test station and said accept station, and means responsive to the position of said movable means when poised over said accept station and moved into slightly spaced juxtaposition for causing said valve means to cut off suction at all of said orifices thereby depositing all of the groups of articles found acceptable at said accept station.

12. An apparatus for testing and assorting articles comprising indexing means for presenting said articles arrayed in groups of identical number and arrangement, a series of movable article pick up means corresponding in arrangement and number to that of each of said groups, a series of probe means movably mounted in corresponding arrangement and number so as to be adapted to be urged toward a group of articles at a test station, means for urging said probe means and pick up means toward said group undergoing test so as to place said pick up and probe means into operative relationship with said group of articles, test means for detecting variations in a property of said articles from an acceptable range, selector means in said test means for subjecting the articles of said group by connecting said probe means in said test means sequentially in a predetermined order to said test means, means conditioned on detection of acceptable articles by said test means for actuating said pick up means in the same predetermined order, means for withdrawing said probe and pick up means from said group, means transferring said withdrawn pick up means and any articles retained thereby from said test station to an accept station and for transferring said pick up means back again to the test station with a delay at each of said stations during which said transfer means remains inactive, means for effectuating release of said transferred articles at said accept station, and means for operating said indexing means, transfer means, urging and withdrawal means, selector means and release means in synchronism with each other.

References Cited in the file of this patent
UNITED STATES PATENTS

| | | |
|---|---|---|
| 2,417,488 | Handforth et al. | Mar. 18, 1947 |
| 2,430,080 | Reynolds | Nov. 4, 1947 |
| 2,451,613 | Darby | Oct. 19, 1948 |
| 2,468,843 | Sunstein | May 3, 1949 |
| 2,585,121 | Hartman | Feb. 12, 1952 |
| 2,645,341 | Diamond | July 14, 1953 |